July 20, 1943.                E. B. MOSS                 2,325,018
                        PNEUMATIC PRESSURE HEAD
                         Filed July 17, 1941           3 Sheets-Sheet 1
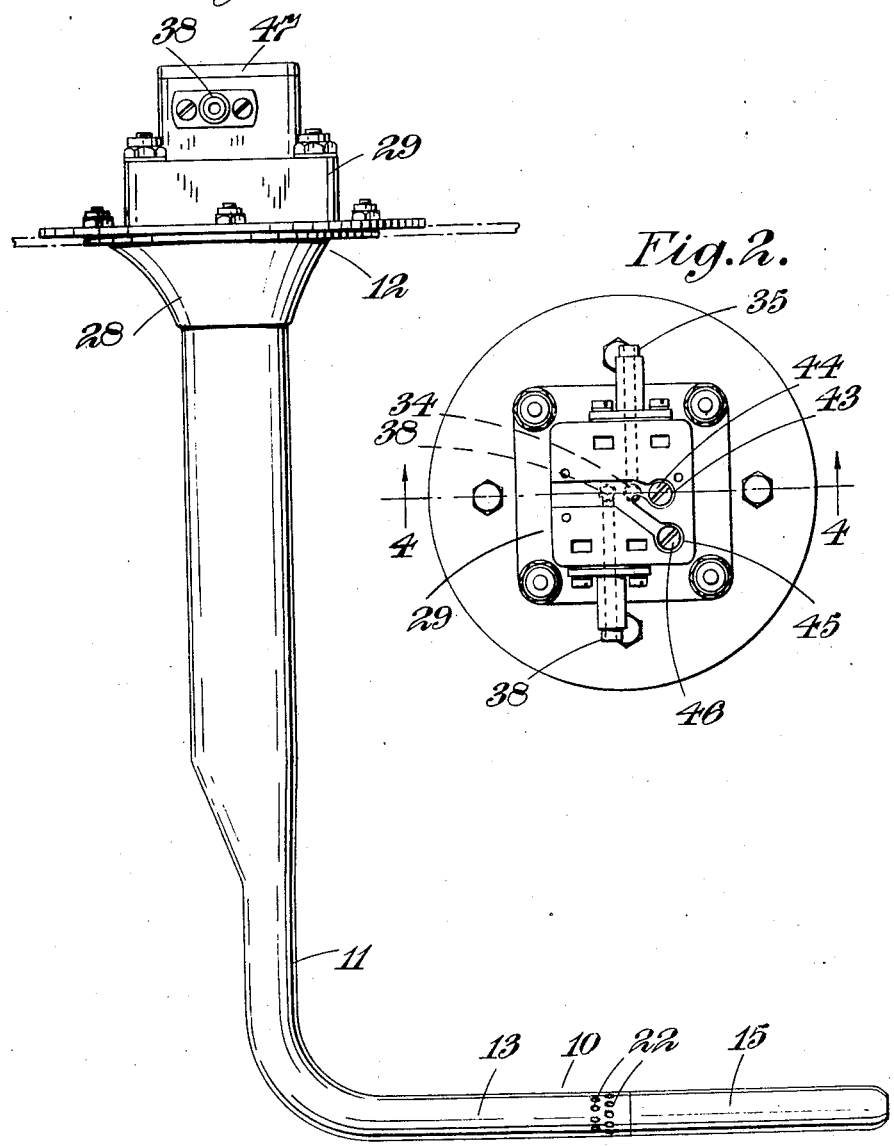

July 20, 1943.  E. B. MOSS  2,325,018
PNEUMATIC PRESSURE HEAD
Filed July 17, 1941  3 Sheets-Sheet 2

Inventor
Eric B. Moss
By Watson, Cole, Grindle & Watson,
Attorneys

July 20, 1943. E. B. MOSS 2,325,018
PNEUMATIC PRESSURE HEAD
Filed July 17, 1941 3 Sheets-Sheet 3

Patented July 20, 1943

2,325,018

UNITED STATES PATENT OFFICE 2,325,018

PNEUMATIC PRESSURE HEAD

Eric Beecroft Moss, London, England, assignor to S. Smith & Sons (Motor Accessories) Limited, Cricklewood, London, England, a British company Application July 17, 1941, Serial No. 402,869
In Great Britain May 3, 1940

10 Claims. (Cl. 73—212)

This invention relates to pneumatic pressure heads for use on aircraft. The invention is concerned with such pressure heads of the kind consisting of a tubular structure comprising a forward chamber at one end with an opening to face a current of air for measuring dynamic pressure and a rearward chamber having lateral openings to provide static pressure in this latter chamber. To avoid incorrect dynamic pressure readings due to ice formation it has been proposed to provide the forward chamber with a heating element but it has been found that the heating of the forward chamber does not prevent the formation of ice on the rearward chamber and such ice formation upsets the static pressure. One object of the invention is to overcome this difficulty.

The invention comprises a pneumatic pressure head of the kind referred to consisting of a heating element for heating the forward dynamic pressure chamber and extending rearwardly beyond the openings in the static pressure chamber to prevent formation of ice in the neighbourhood of these openings. A feature of the invention consists in that the heating element is disposed in the dynamic pressure chamber and in a tubular extension of this chamber passing through the static pressure chamber.

A further feature of the invention consists in that the forward part of the pressure head comprising the whole or part of the dynamic pressure chamber and the heating element is removable from the pressure head through the front of the tubular extension of the dynamic pressure chamber. Preferably, the tubular extension of the dynamic pressure chamber is enlarged at its forward end and is secured to the inner wall of the static pressure chamber to constitute a front wall of this chamber. The enlarged part of the tubular extension conveniently constitutes a mounting for the removable forward part of the pressure head.

To meet particular test requirements for a pressure head the insulation resistance between the heating element and the frame of the aircraft must withstand an applied voltage of 500 without breaking down. In previous constructions the heating element has been in the form of a coil with a return lead passing inside or outside the coil, and this, in addition to the requirement for insulation resistance which has necessitated rather thick insulation between the heating element and the pressure head, adds to the bulk of the element. The insulation and the return lead of the coil have added to its bulk and a further object of the invention is to provide a compact heating coil by avoiding these complications. Therefore, according to a further feature of the present invention a pressure head has a heating coil with a return lead constituted by the pressure head, or part thereof, or by an additional conductor such as a conducting sheath constituting the cable forming the coil, the pressure head itself being well insulated from the frame of the aircraft. Thus, the insulation of the coil need only be of a light character, depending upon the actual pressure of the current employed.

Certain specific constructions of pressure head according to the invention is shown by way of example in the accompanying drawings, in which—

Figure 1 is an elevation of the complete pressure head and its mounting;

Figure 2 is a plan view of the mounting with a cover removed;

Figure 4 is a section on line 4—4 of Figure 2;

Figure 5 is an enlarged fragmentary detailed view similar to Figure 3 but showing only a portion of the tip of the pressure head in which one form of return lead is shown; and Figure 6 is a view identical with Figure 5 with the exception that an alternative means for providing the return lead is shown.

Figure 3:
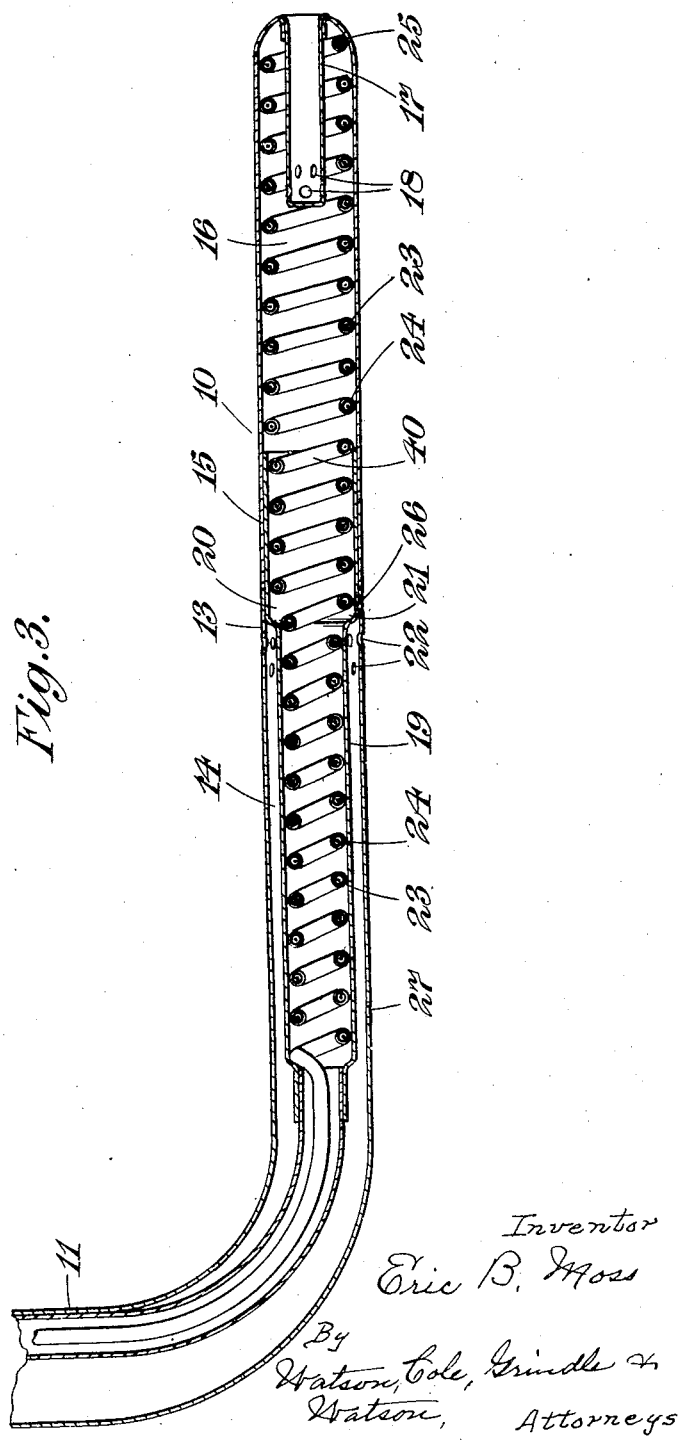
Figure 3 is an enlarged sectional elevation of the pressure head.

The pressure head comprises a cylindrical casing carried in a mounting for attachment to the aircraft and having its free end extending forwardly in the direction of flight, regardless of the position in which it is to be placed on the aircraft. In the construction shown in the drawings, the cylindrical casing indicated at 10 has a part 11 carried in a mounting 12 to be secured to the under-side of a wing of the aircraft in such manner that the casing 10 extends forwardly in the direction of flight. This cylindrical casing, which may be conveniently constructed of sheet meta, is in two parts, a rear fixed part 13 forming the static pressure chamber 14 and a removable forward part 15 providing the dynamic pressure chamber 16. The front end of the forward part 15 of the casing is closed around a tubular baffle 17 extending into the dynamic pressure chamber. This tubular baffle is open at its forward end and its inner end has a plurality of openings 18 communicating with the dynamic pressure chamber. This tubular baffle is for the purpose of preventing uneven heating due to eddies.

The dynamic pressure chamber has a rearward extension provided by a tubular part 19 passing through the static pressure chamber 14. The part 19 may also be made of sheet material. At its forward end this tubular part is enlarged to provide a sleeve 20 fitting in the outer end of the part 13 of the cylindrical casing and secured thereto by hard solder. This enlargement of the tubular part 19 provides a front wall 21 of the static pressure chamber and the lateral openings for this chamber indicated at 22 are provided in the part 13 of the cylindrical casing just behind this wall 21. The sleeve 20 extends beyond the front end of the part 13 of the casing and the forward part 15 of the casing is slidable on this sleeve so as to be detachable.

The heating element consists of an electric cable 40 in the form of a helical coil located adjacent the inner side of the front part 15 of the casing and adjacent the inner side of the tubular part 19 forming an extension of the dynamic pressure chamber. This coil extends from the extreme front end of the dynamic pressure chamber at least as far as the rear end of the tubular part 19 as shown. This cable consists of an insulated conductor 23 and a conducting sheath 24, which may also be insulated, and the sheath is connected to the conductor at the forward end 25 of the coil, so that the sheath constitutes a return lead for the conductor 23. This connection is clearly shown in Figure 5 of the drawings in which the conductor 23 is extended beyond the end 25 of the cable 40 and is soldered, welded or otherwise secured as at 100, with the conducting sheath 24.

A drain hole 26 is provided for the dynamic chamber and another drain hole 27 may be provided at the rear part of the static pressure chamber, the heating coil extending rearwardly beyond this drain hole to prevent it becoming blocked due to ice formation.

The mounting 12 of the pressure head comprises a rubber socket 28 in which the inner end of the cylindrical casing 11 is secured. On this socket there is mounted an insulating member 29 carrying connections for the dynamic and static pressure chambers and electrical connections for the heating coil. The inner end of the tubular part 19 of the pressure head is connected to a pipe 30 which passes at its inner end through a baffle 31 across the part 11 of the casing. This pipe communicates by way of a passage 32 in a metal end plug 33 for the casing and short tube 32' with a duct 34 in the insulator 29, terminating at a spigot 35 for an external pipe connection. The static pressure chamber communicates by way of the part 11 of the casing and a passage 36 extending through the baffle 31 and connected by way of tube 36' through the plug 33 with another duct 37 in the insulator terminating at a spigot 38 for the pipe connection. These pipe connections are for an instrument to be operated by the pressure head in the known manner.

The cable extends through the pipe 30 and through the bore 33' in the plug 33 and the conducting sheath 24 of the cable is soldered at 39 to the upper surface of the plug 33. The conductor 23 of the cable is soldered at 49 in a terminal pin 41 carried by the insulator 29. The terminal pin 41 engages frictionally in a conducting socket 43 which receives a terminal screw 44 and the pin is supported upon the insulation block 41'. Another terminal pin is connected to the top of the plug 33 and engages in a socket 45 receiving a terminal screw 46. A removable cover 47 shields the terminal screws 44 and 46. The casing of the pressure head and also the plug 33 are insulated from the wing of the aircraft by the rubber socket 28. The casing is alive and may be used as the return connection for the conductor 23 instead of the sheath 24. In a case where the casing 10 and 11 constitutes the return lead, it will be noted that the part 11 contacts with the metal plug 33 and thus the circuit is completed through the plug to the pin and socket connection for the terminal 46. This alternative connection is shown in Figure 6 of the drawings in which the conductor 23 is extended beyond the end 25 of cable 40 and is electrically secured by any suitable means as at 101, to the casing portion 15. Alternatively, other expedients employing patentable equivalents of the means disclosed may me used within the scope of the invention.

The heating coil can be readily withdrawn for replacement by removing the insulating member 29 which carries with it the socket 43 thereby exposing the terminal pin 41 which may then be heated so as to melt the solder enabling the terminal pin to be separated from the conductor 23. Upon removal of the terminal pin 41 and the part 41' the soldered part at joint 39 may, of course, be similarly melted to permit the withdrawal of the conductor 23, 24 and the entire heating element through the front of the casing. Heavy insulation of the conductor is not necessary as the supply voltage does not normally exceed twenty-four volts. The turns of the coil of the heating element may be evenly spaced or they may be spaced unevenly according to the heat distribution required.

I claim:

1. A pneumatic pressure head comprising a tubular casing having a forward chamber with a front opening for measuring dynamic pressure and a rearward chamber having lateral openings to provide static pressure in said rearward chamber, an axial tubular extension of said forward chamber passing through said rearward chamber and occupying all but a relatively narrow annular space adjacent the outer periphery of the latter chamber and a heating element disposed in said forward chamber and in said tubular extension of this chamber.

2. A pneumatic pressure head comprising a tubular casing having a forward chamber with a front opening for measuring dynamic pressure and a rearward chamber having lateral openings to provide static pressure in said rearward chamber, an axial tubular extension of said forward chamber passing through said rearward chamber and occupying all but a relatively narrow annular space adjacent the outer periphery of the latter chamber and a heating element disposed in said forward chamber and in said tubular extension of this chamber, a forward part of said tubular casing comprising at least a part of the forward chamber being removable and said heating element being removable from the tubular casing through the front of the said tubular extension of the forward chamber.

3. A pneumatic pressure head comprising a tubular casing having a forward chamber with a front opening for measuring dynamic pressure and a rearward chamber having lateral openings to provide static pressure in said rearward chamber, an axial tubular extension of said forward chamber passing through said rearward chamber and occupying all but a relatively narrow annular space adjacent the outer periphery of the latter chamber, said tubular extension having an enlarged part at its forward end secured to the inner wall of the rearward chamber to constitute the front wall of this chamber separating it from the forward chamber and a heating element disposed in said forward chamber and in said tubular extension of this chamber.

4. A pneumatic pressure head comprising a tubular casing having a forward chamber with a front opening for measuring dynamic pressure and a rearward chamber having lateral openings to provide static pressure in said rearward chamber, an axial tubular extension of said forward chamber passing through said rearward chamber and occupying all but a relatively narrow annular space adjacent the outer periphery of the latter chamber, said tubular extension having an enlarged part at its forward end secured to the inner wall of the rearward chamber to constitute the front wall of this chamber separating it from the forward chamber and a heating element disposed in said forward chamber and in said tubular extension of this chamber, a forward part of said tubular casing comprising at least a part of the forward chamber being removable and said heating element being removable from the tubular casing through the front of the tubular extension of the forward chamber.

5. A pneumatic pressure head comprising a tubular casing constituting a static pressure chamber and having lateral openings therein, a tube passing through said static pressure chamber, said tube being enlarged at its forward end and secured to the inner wall of the static pressure chamber to form the front wall of said chamber, said enlarged tubular end extending beyond said tubular casing forming the static pressure chamber, a cylindrical cap detachably mounted on said enlarged extending tubular end and constituting a dynamic pressure chamber, a heating coil located in said dynamic pressure chamber, and in said tube passing through said static pressure chamber, a mounting to which the tubular casing is secured, terminals in said mounting for the conductor ends of said heating coil, readily severable means for connecting said ends with said terminals so as to permit the heating coil to be removed from the front end of the said tube on removal of the said cap constituting the dynamic pressure chamber.

6. A pneumatic pressure head comprising a tubular casing constituting a static pressure chamber and having lateral openings therein, a tube passing through said static pressure chamber, said tube being enlarged at its forward end and secured to the inner wall of the static pressure chamber to form the front wall of said chamber, said enlarged tubular end extending beyond said tubular casing forming the static pressure chamber, a cylindrical cap detachably mounted on said enlarged extended tubular end and constituting a dynamic pressure chamber, and a heating coil located in said dynamic pressure chamber and in said tube passing through said static pressure chamber.

7. A pneumatic pressure head comprising a tubular casing constituting a static pressure chamber and having lateral openings therein, a tube of sheet material passing axially through said static pressure chamber, said tube being enlarged at its forward end to approximately the diameter of said casing, and secured to the inner wall of the static pressure chamber to form the front wall of said chamber, said enlarged tubular end extending beyond said tubular casing forming the static pressure chamber, and a cylindrical cap detachably mounted on said enlarged extended tubular end and constituting a dynamic pressure chamber.

8. A pneumatic pressure head comprising a tubular casing constituting a static pressure chamber and having lateral openings therein, a tube passing through said static pressure chamber, said tube being enlarged at its forward end and secured to the inner wall of the static pressure chamber to form the front wall of said chamber, said enlarged tubular end extending beyond said cylindrical casing forming the static pressure chamber, a cylindrical cap detachably mounted on said enlarged extended tubular end and constituting a dynamic pressure chamber, and a heating coil located in said dynamic pressure chamber and in said tube passing through said static pressure chamber, said coil comprising a single conducting strand, the return lead being constituted by the casing of the pressure head.

9. A pneumatic pressure head comprising a tubular casing having a forward chamber with a front opening therein, said chamber and opening being so constructed and arranged to comprise a dynamic pressure chamber, a tubular rearward chamber in said casing, a tubular extension from the dynamic pressure chamber passing into the rearward chamber, said extension being of smaller diameter than said rearward chamber so as to form an annular space between the respective walls thereof, the wall of said tubular rearward chamber being provided with openings opposite the annular space, and a coiled heating element disposed in said forward chamber and said extension so as to extend rearwardly beyond the openings in the rearward chamber to prevent formation of ice in the neighborhood of said openings, and means for connecting said dynamic pressure chamber extension and said rearward chamber with a differential pressure responsive device.

10. A pneumatic pressure head comprising a tubular casing enclosing a rearward static pressure chamber, a tube passing through said static pressure chamber and forming an annular space therewith, said tube being enlarged at its forward end and secured to the inner wall of the static pressure chamber to form a closure for said annular space, said tubular casing being provided with lateral openings into said annular space, the enlarged portion of said tube extending beyond the cylindrical casing, a cylindrical cap detachably mounted on said projecting enlarged part and constituting a dynamic pressure chamber, a heating coil located in said dynamic pressure chamber and in said tube passing through said static pressure chamber, mounting means to which the tubular casing is secured, said mounting means including terminals electrically connected with the ends of said heating coil, said ends of the coil being disconnectable from said mounting means so as to permit the heating coil to be removed from the front end of said tube on the removal of the said cap.

ERIC BEECROFT MOSS.